United States Patent [19]

Vandaele

[11] Patent Number: 5,697,411
[45] Date of Patent: Dec. 16, 1997

[54] WORKPIECE SUPPORT APPARATUS

[76] Inventor: Daniel Vandaele, 4523 Robin Ave., Naples, Fla. 34104

[21] Appl. No.: 772,702

[22] Filed: Dec. 23, 1996

[51] Int. Cl.$^6$ .................................................. B25H 1/02
[52] U.S. Cl. .................... 144/287; 269/289 MR; 248/133; 182/181; 144/286.5
[58] Field of Search ............... 182/181; 248/168–170, 248/133, 139, 141, 143; 269/289 MR, 901; 144/286.1, 286.5, 287

[56]  References Cited

U.S. PATENT DOCUMENTS

| | | |
|---|---|---|
| 4,753,279 | 6/1988 | Harris . |
| 4,830,076 | 5/1989 | Feyer ........................ 144/287 |
| 5,064,156 | 11/1991 | Handler et al. . |
| 5,247,976 | 9/1993 | Matthews . |

Primary Examiner—W. Donald Bray
Attorney, Agent, or Firm—Myron E. Click

[57]  ABSTRACT

A workpiece support apparatus, which may be adjustable, for mounting on a base to facilitate the handling of long or unwiedly stock or other workpieces advancing from a processing station. The support apparatus includes a workpiece engaging member having an upper planar surface which extends generally laterally with respect to a travel path of a free end of a workpiece advancing from a processing station. The engaging member is pivotally supported in the travel path with the planar surface inclined toward the processing station. The planar surface is yieldingly biased into the inclined position, whereby the free end of a workpiece engages the inclined surface to overcome the bias and pivot the engaging member to a substantially horizontal position. When the workpiece is removed, the engaging member is biased back into the inclined position.

17 Claims, 2 Drawing Sheets

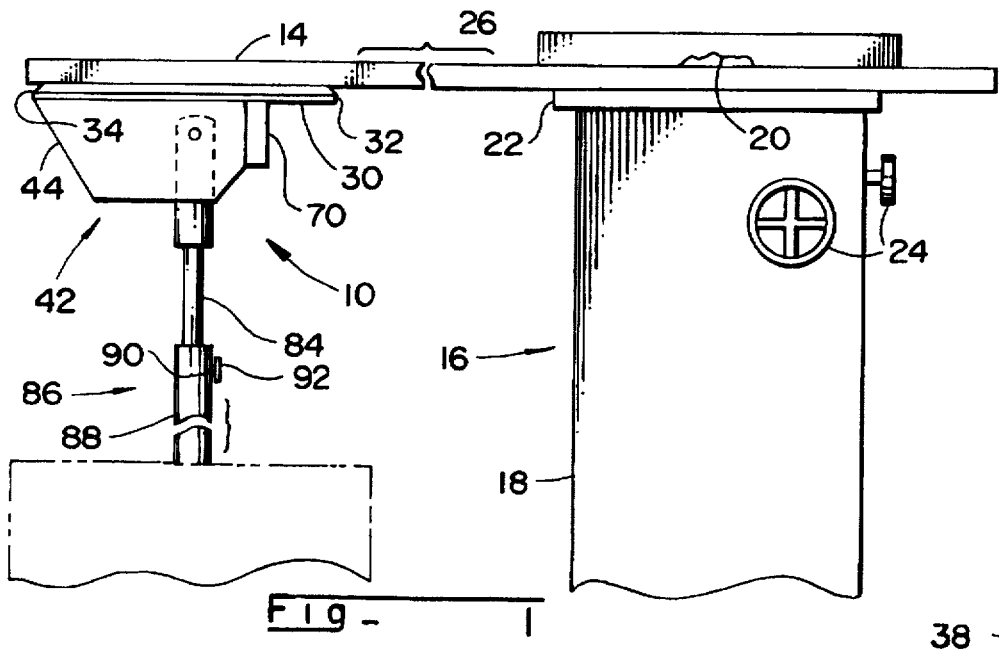
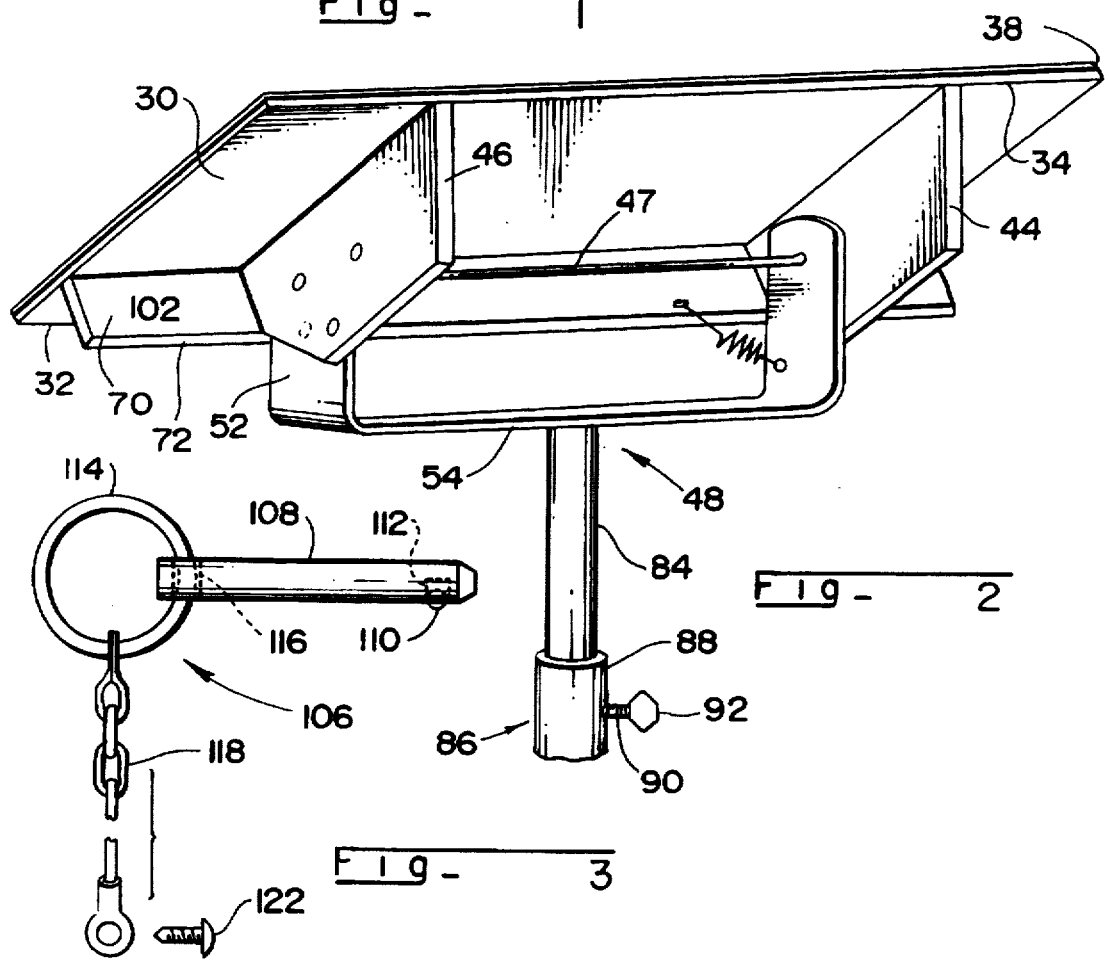

WORKPIECE SUPPORT APPARATUS

BACKGROUND OF THE INVENTION

1. Field of the Invention

This invention relates generally to workpiece support apparatus and, in particular, to a support which may be used as an adjunct to a processing station which processes workpieces and advances them toward the support. The support is readily adjustable, collapsible, and portable and may be used with a free-standing base.

2. Prior Art

A variety of support devices are generally available for supporting long or otherwise unwieldy stock or workpieces being processed at a work station. For example, long pieces of lumber or large sections of sheet metal or wall paneling, cannot usually be properly supported solely by the work station bench or table at which an operation is being performed on the workpiece with a router, radial saw, table saw, or the like. Under such conditions, an additional support apparatus is typically employed to support the portion of the workpiece extending outwardly from or advancing from the processing station.

It should be noted that this invention is not limited to the examples set forth above. It could be used in a bakery with long loaves issuing from a baking oven or a station where condiments, icing, etc. are added. The invention is generally most advantageous when the end of a workpiece issuing or advancing from a processing station tends to sag below the height of most support devices.

Prior art support devices have generally been of two types. A first type is bolted or otherwise attached to the processing station while extending outwardly from a table, bench or other main portion of the processing station. Such devices are understandably of limited use since they can only be spaced a relatively short distance from the processing station, thereby being incapable of providing the type of support contemplated where necessary to handle long or unwieldy stock or workpieces.

Another type of support device is of a freestanding type capable of being moved relative to the processing station for overcoming the limitations referred to above. The most common freestanding type of support device includes a single roller vertically adjustable on a base. Such a device is disclosed in U.S. Pat. No. 5,064,156, issued Nov. 12, 1991 to Handler, et al.

However, such roller stands have many shortcomings, the most notable of which is instability. Such roller stands cannot be set to the table or bench height of the processing station, without the natural sag or downturn of the workpiece coming off the table knocking the stand over. Furthermore, roller stands use a fixed axis which must be set perpendicular the saw blade rip fence so as not to push or pull material from the rip fence. In addition, these support devices are relatively bulky and difficult to store and are designed to function in very limited capacities.

Yet another freestanding support device available in the prior art includes one or more rollers forming a top surface for a four-legged table. Again, these support devices are relatively bulky and difficult to store.

A still further support device is disclosed in U.S. Pat. No. 4,753,279, issued Jan. 28, 1988, to Alan S. Harris. This support device illustrates a roller support for mounting on a clamping type work bench, available for example, under the trademark WORKMATE from the Black and Decker Corporation. This roller support device has the same problems as described above with respect to the device disclosed in U.S. Pat. No. 5,064,156.

Finally, a support device is disclosed in U.S. Pat. No. 5,247,976, ("976") issued Sep. 28, 1993, to Marc R. Matthews. This device uses a generally laterally extending workpiece engaging member having a wing which is movable between two fixed positions, a platform-like position and a ramp-like position. This device further includes roller means 24 located at the apex of the wing 16 when the wing 16 is in a ramp-like position, to prevent a workpiece from sliding away from the operator and onto the floor, after a cut-through of the workpiece is completed.

The "976" structure and function is different from the present invention, which discloses a pivotally mounted engaging member which is yieldingly biased in an inclined position to accept a free end of an advancing workpiece and can pivot toward a platform-like position as the workpiece advances. However when the operation is complete, and the workpiece is removed from this invention's support device, the engaging member automatically returns to the inclined position and is ready to accept another advancing workpiece. This obviously saves a lot of time and money. Moreover, this invention is much less costly than any of the prior art support devices, both in initial expense and ongoing maintenance. Finally, this invention not only has a different structure, but performs functions that prior art devices cannot do.

Accordingly, it is an object of this invention to provide an improved workpiece support apparatus.

Another object of this invention is to provide a workpiece support apparatus which is less expensive to manufacture and maintain than prior art devices, and which performs functions that prior art devices cannot.

Other objects, advantages and features of this invention will become apparent when the following description is taken in conjunction with the accompanying drawings.

SUMMARY OF THE INVENTION

A workpiece support attachment for mounting to a base, which includes a workpiece engaging member having a substantially planar upper surface, which extends generally laterally with respect to the travel path of a free end of a workpiece advancing from a processing station.

Means are provided for pivotally supporting the engaging member in the travel path, with the planar surface inclined toward the processing station.

Means are also provided for yieldingly biasing the planar surface into the inclined position, whereby as an advancing free end of a workpiece engages the inclined surface and slides up the incline the engagement with the workpiece will overcome the yielding bias and pivot the engaging member to a position in which the planar surface is substantially fully in contact with and supporting the underside of the workpiece. However, when the workpiece is removed from the engaging member, the planar surface returns to the inclined position in response to the yieldingly biasing means.

Means are also provided for releasably connecting the workpiece support attachment to a base support. Further, means are provided for adjusting the height of the workpiece support. In addition, means are provided for stopping the pivoting of said workpiece engaging member at a selected position, whereby the planar surface is inclined at the same angle each time.

There is also disclosed means for releasably securing the engaging member in a position in which the planar surface is substantially horizontal, thereby enabling use of said engaging member as a work platform. Also disclosed are means for releasably securing the workpiece engaging member in a position in which the planar surface is substantially vertical, thereby compacting the size of the workpiece support attachment for storage.

There are a number of means disclosed for applying the yielding bias to the workpiece engaging member. The first example is by using means for adding weight to the pivotally mounted engaging member at a location where the force of gravity on the weight will pivot the engaging member into the inclined position. Second, a spring means may be connected to pull the workpiece engaging member into the planar surface inclination toward the processing station, the spring means having a spring force which can be overcome by the engagement of the advancing free end of a workpiece with the inclined planar surface.

The pivotally supporting means may include spaced bracket members extending downwardly from the workpiece engaging member. The bracket members each carrying means for journally receiving pivot shaft means. In this instance the journally receiving means may be located to the rear of the center of gravity of the workpiece engaging member, thereby enabling the engaging member to pivot in response to the pull of gravity into the planar surface inclined position toward the processing station.

The pivotally supporting means may also include yoke means having spaced arms extending upwardly from a cross member. Each yoke arm is associated with and located proximate to one of the bracket members, and means for pivotally connecting each yoke arm to its associated bracket member.

The pivotally supporting means may further include a cross piece member extending between the spaced bracket members forward of the center of gravity of the pivotally mounted workpiece engaging member. The cross piece member has sufficient weight to pivot the planar surface of the workpiece engaging into the inclined position.

The cross piece member is located so that a lower edge thereof rests against at least one arm of the yoke means when the planar surface is in the inclined position, thereby serving as a stop means to insure that the planar surface is inclined at the same angle each time to receive a free end of an advancing workpiece.

The workpiece support also includes means for releasably securing the workpiece engaging member in a work platform position with the planar surface in a substantially horizontal position. At least one of the bracket members having a platform position bore formed therethrough, and in which a yoke arm associated with that one bracket member also has a bore formed therethrough. The bracket bore and the yoke arm bore being located so that when the workpiece engaging member is pivoted on the pivotally supporting means, the bracket and yoke arm bores will be aligned when the planar surface is substantially horizontal. Means for insertion through the aligned bores will releasably secure the workpiece engaging member in a work platform position.

The workpiece support further includes means for releasably securing the workpiece engaging member in a compact storage position with the planar surface in a substantially vertical position. At least one of the bracket members has a storage bore formed therethrough, and a yoke arm associated with the one bracket member also having a bore therethrough. The bracket bore and the yoke arm bore being located so that when the workpiece engaging member is pivoted on the pivotally supporting means the bracket and yoke arm bores will be aligned when the planar surface is substantially vertical. Means for insertion through the aligned bores will releasably secure the workpiece engaging member in a compact storage position.

Means attached to and extending downwardly from the cross member of the yoke means provide for releasably connecting the workpiece support attachment to a base support. Means are also provided for selectively adjusting the height of said workpiece support attachment.

BRIEF DESCRIPTION OF THE DRAWINGS

FIG. 1 is a side view in elevation of an adjustable workpiece support attachment mounted on a support base positioned in spaced apart relation from a workpiece processing station.

FIG. 2 is an enlarged view in perspective taken from the left rear corner of a workpiece support attachment embodying the teachings of this invention.

FIG. 3 is an enlarged view of an insertion pin means for releasably securing the workpiece support attachment in work platform and storage positions.

DESCRIPTION OF PREFERRED EMBODIMENTS

Figure 4:
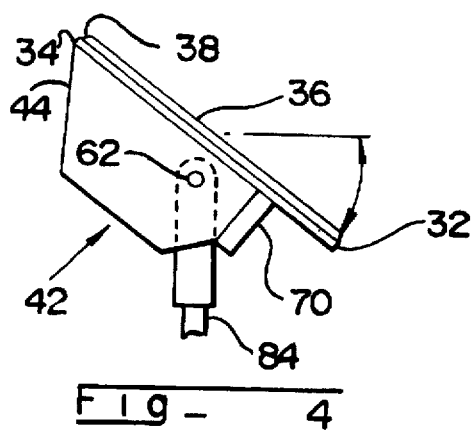
FIG. 4 is a side elevational view of the support attachment in a workpiece receiving position.

Referring now to the drawings, we will first discuss FIG. 1. An adjustable workpiece support attachment is generally indicated at 10, for mounting on a usually free-standing base support 12, in order to support long or otherwise unwieldy stock, workpieces, or the like 14 being processed by a processing station generally indicated at 16.

The base support 12 may be any suitable device known to those skilled in the art. An example shown in the prior art is a clamping type work bench commercially available under the trademark WORKMATE from the Black and Decker Corporation, and attachment of a workpiece support is shown in FIG. 1 of U.S. Pat. No. 4,753,279. Another example of a free-standing support base is shown in FIG. 1 of U.S. Pat. No. 5,247,976. A still further example of a free-standing support base is shown in FIG. 1 of U.S. Pat. No. 5,064,156. Still another example is a free-standing support base, Model No. 875,580, sold by Woodworker's Supply, Inc., of Graham, N.C., and is the preferred embodiment to be used with this invention, since it has mounting means and means for adjusting the height of the workpiece as shown in this application. Any desired modifications of this and the other free-standing support bases may be easily made by those skilled in the art.

It should be noted that a support base 12 does not have to be free-standing, and can be attached to a processing station, but a free-standing base is preferred for flexibility and to handle longer workpieces.

Referring again to FIG. 1, the processing station illustrated is merely exemplary of a number of different processing stations which processes workpieces and advances a free end of a processed workpiece toward the adjustable workpiece support attachment of this invention. The processing station 16 may also be other stationary or movable power tools, such as cutoff saws, radial arm saws, planers, surfacers, routers, shapers, etc. Any other processing stations may be used in conjunction with the invention herein, particularly when the free end of an advancing workpiece tends to sag as it leaves the processing station.

The processing station 16 in FIG. 1 is a table saw which includes a base 18 for supporting a motor-driven saw blade 20, which is movable, for example, by controls 24 for assuring greater versatility. The table saw 16 is also equipped with a fence 26 for positioning stock 14 as it is moved across the table 22 to be cut by the blade 20.

As shown in the drawings, and particularly in FIG. 2, the support attachment 10 includes a workpiece engaging member 30 having a forward edge 32, which faces toward a processing station 16, a rear edge 34 facing away from a station 16, and a substantially planar upper surface 36. Surface 36 advantageously has a low friction or slide resistance, non-marring material. In this embodiment, the engagement member 30 has a generally rectangular shape, which extends generally laterally with respect to a travel path of a free end of a workpiece advancing from a processing station. The upper edges are beveled at 38 to further reduce the possibility of marring the workpiece, and to aid the passage over the rear edge 34 as the workpiece reaches the top of the incline.

Figure 7:
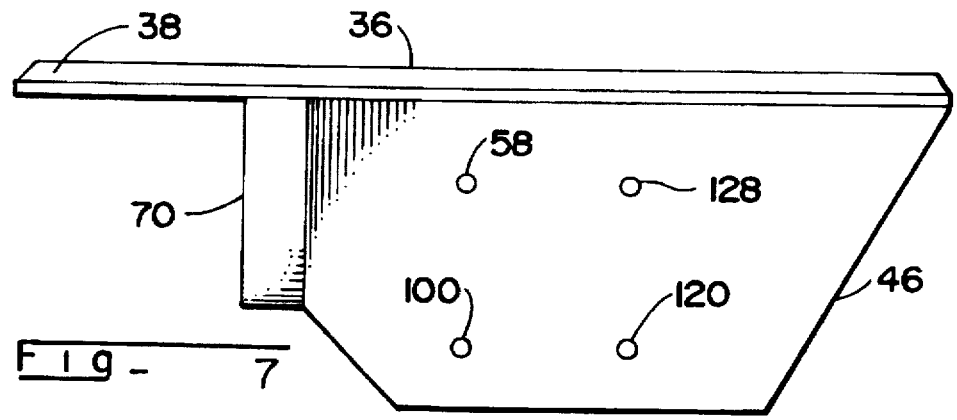
FIG. 7 is an enlarged side elevation of the support attachment showing the location of pivot shaft, work platform, storage, and pin means attachment bores.
Figure 8:
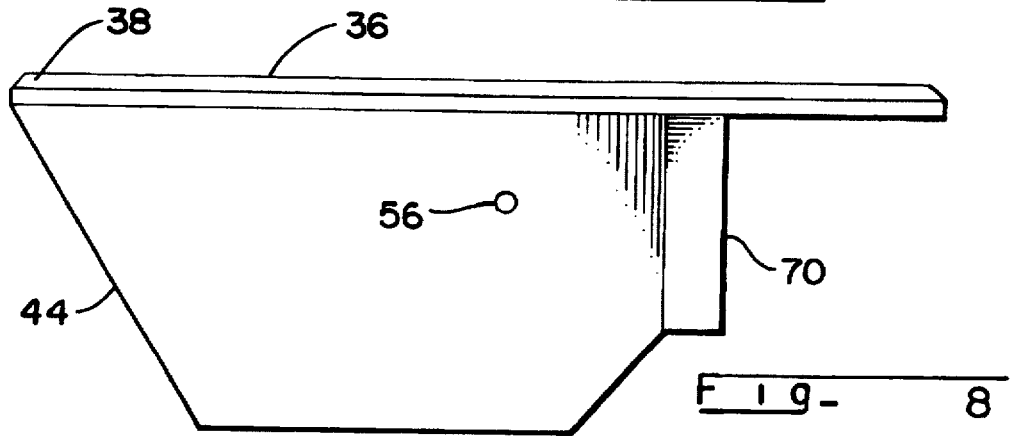
FIG. 8 is an enlarged elevational view of the other side of the workpiece support illustrated in FIG. 7.

Means indicated generally at 42 are provided for pivotally supporting the engaging member 30, and include spaced bracket members 44, 46 extending downwardly from the engaging member 30. Each of the bracket members 44, 46 carry means for journally receiving pivot shaft means 47, which may be an axle, rod or individual pivot means. Brackets 44 and 46, have pivot shaft bores 56, 58, respectively, to receive pivot shaft means as best seen in FIGS. 7 and 8.

Pivotal support means 42 may also include yoke means 48, which has spaced arms 50, 52 extending upwardly from a cross member 54. Bores 60, 62 are formed in arms 50, 52, as shown in FIGS. 2 and 4, to be aligned with bores 56, 58 in the brackets 44, 46 so that pivot shaft means can be inserted therethrough.

There are a plurality of different means for yieldingly biasing the upper planar surface 36, into the inclined position facing the processing station 16 shown in FIGS. 2 and 4. That inclined position permits the surface 36 to engage the sagging free end of a workpiece 14 advancing from station 16, and guide the free end up the inclined planar surface until the engaged workpiece overcomes the yielding bias and pivots the planar surface as shown by the arrows in FIG. 4 to the position shown in FIG. 1, where the under side of the workpiece is supported at a desired height with respect to the processing station. When the workpiece is removed from the planar surface 36, the force of the yielding bias returns the planar surface 36 to its inclined position.

A first of the plurality of means for applying a yielding bias may be a cross-piece 70 attached between spaced brackets 44, 46, and located so that the weight of cross-piece 70 will respond to the pull of gravity to pull the planar surface down to the desired inclined position. The weight is such that engagement of surface 36 by a workpiece 14 will overcome the force of gravity on the cross-piece and pivot the surface to a normally horizontal position.

An additional function of cross-piece 70 is that a lower edge 72 rests against at least one of the yoke arms 50, 52 to provide a stop means for the pivoting surface 36, thus insuring that the planar surface is inclined at the same angle each time. The cross-piece 70 also serves as means for supporting and stiffening the engaging member 30, enabling the thickness of member 30 to be reduced to save weight and money in the shipping and manufacture of this invention.

A second means for applying yielding bias may be a spring means 76, shown in FIG. 2 where it is connected between a yoke arm 50 and the cross-piece 70, to pull the cross-piece 70 down and thus the planar surface into the desired inclined position. The spring means 76 has a spring force which can be overcome by engagement of the advancing free end of a workpiece with the inclined planar surface to pivot the planar surface to a substantially horizontal workpiece support position.

A third means for applying yielding bias is to selectively locate the journally receiving bores or means to the rear of the center of gravity of the workpiece engaging member, thereby enabling the engaging member to pivot in response to the pull of gravity into the desired inclined position toward the processing station.

Means for releasably connecting the workpiece support attachment to a base support include a downwardly extending member 84 which may be attached by welding or other known fastening means to the cross member 54 of the yoke means 48. Means indicated generally at 86 for adjusting the height of the workpiece support attachment includes means 88, for slidably receiving the extension member 84, which is attached to the base support 12. The extension member 84 may be selectively located at a desired height by a set screw 90 in a threaded bore in slidable receiving means 88. A grip knob 92 on the end of set screw 90 provides manual means for tightening or loosening the set screw with respect to extension member 84.

Figure 6:
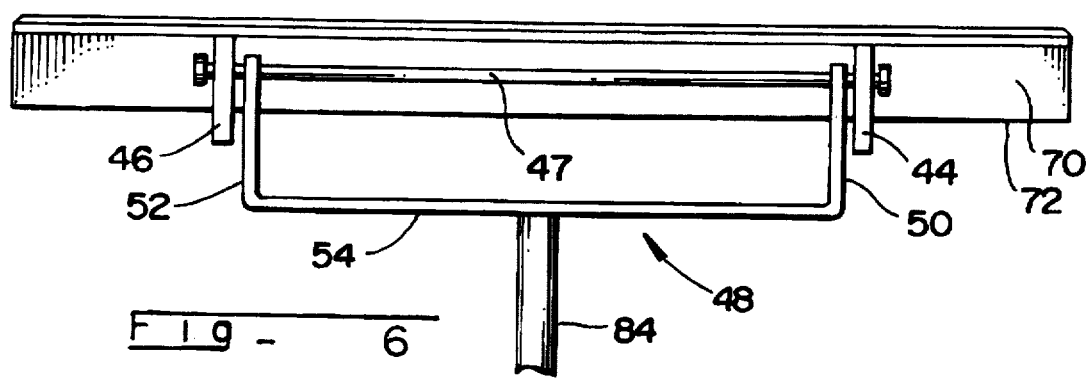
FIG. 6 is a rear view of the support attachment in a work platform position.

It is desirable to be able to provide means for releasably securing the workpiece engaging member in a work platform position. To accomplish this a work platform bore 100 is formed through bracket 46 (best seen in FIGS. 2 and 7). A bore 102 is formed in the lower part of yoke arm 52. Bores 100 and 102 can be aligned by pivoting the workpiece engaging member 30 to a position where the upper planar surface is substantially horizontal (as shown in FIG. 6).

A pin means indicated generally at 106 has a pin 108 which is inserted through the work platform bore 100 and the yoke arm bore 102 when they are aligned in the work platform position. A spring biased ball bearing 110 in bearing bore 112 formed in pin 108 retains pin 108 in place in bores 100, 102 to releasably secure the engaging member 30 in the work platform position. The pin 108 has bore 116 formed therethrough to receive a support ring 114. A retaining chain 118 connected to ring 114 may be secured to bracket 46 by screw 122 in support bore 120.

Figure 5:
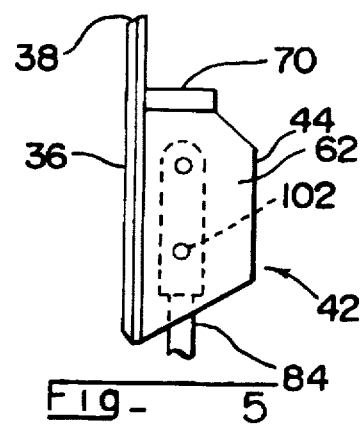
FIG. 5 is a side elevational view of the support attachment in a storage position.

Means are also provided for releasably securing the engaging member 30 in a storage position, as illustrated in FIG. 5, with the planar surface 36 in a substantially vertical position to compact the support attachment 10 in a storage position. This is accomplished by forming a storage bore 128 in bracket 46. When the workpiece engaging member 30 is pivoted to a substantially vertical position, the storage bore 128 is aligned with the yoke arm bore, and pin 108 may be inserted therethrough to releasably secure the workpiece engaging member in the storage position.

Thus, in a work platform position at least one of the spaced bracket members has a platform position bore formed therethrough, and a yoke arm associated with the one bracket member also has a bore formed therethrough.

Similarly, in a storage position at least one of the spaced bracket members has a storage bore formed therethrough, and a yoke arm associated with the one bracket member also has a bore formed therethrough.

While the choice of the specific components and their arrangement in the preferred embodiments described herein illustrate the results and advantages over the prior art, the invention is not limited to those specific components and their arrangement. Thus, the forms of the invention shown herein and described are to be taken as illustrative only, and changes in the components or their arrangement may be made without departing from the spirit and scope of this invention. There has been disclosed apparatus which differs structurally from, provides functions not performed by, and has clear advantages over the prior art.

I claim:

1. A workpiece support attachment for mounting to a base, comprising;
   (a) a workpiece engaging member having a substantially planar upper surface, which extends generally laterally with respect to a travel path of a free end of a workpiece advancing from a processing station,
   (b) means for pivotally supporting said engaging member in said travel path, with said planar surface inclined toward the processing station,
   (c) means for yieldingly biasing said planar surface of said engaging member into said inclined position, whereby as an advancing free end of a workpiece engages said inclined surface and slides up the incline, the engagement with the workpiece will overcome said yielding bias and pivot said engaging member to a position in which said planar surface is substantially fully in contact with and supporting the underside of the workpiece, and when said workpiece is removed from said engaging member said planar surface returns to said inclined position in response to said yieldingly biasing means.

2. A workpiece support as defined in claim 1 which further includes means for releasably connecting said workpiece support attachment to a base support.

3. A workpiece support as defined in claim 1 which further includes means for adjusting the height of said workpiece support.

4. A workpiece support as defined in claim 1 which includes means for stopping the pivoting of said workpiece engaging member at a selected position, whereby said planar surface is inclined at the same angle each time.

5. A workpiece support as defined in claim 1 which further includes means for releasably securing said workpiece engaging member in a position in which said planar surface is substantially horizontal, thereby enabling use of said engaging member as a work platform.

6. A workpiece support as defined in claim 1 which further includes means for releasably securing said workpiece engaging member in a position in which said planar surface is substantially vertical, thereby compacting the size of the workpiece support attachment for storage.

7. A workpiece support as defined in claim 1 in which said yielding bias means incudes means for adding weight to said pivotally mounted engaging member at a location where the force of gravity on said weight will pivot said engaging member into said inclined position.

8. A workpiece support as defined in claim 1 in which said yieldingly biasing means includes spring means connected to pull said workpiece engaging member into said planar surface inclined position toward the processing station, said spring means having a spring force which can be overcome by the engagement of the advancing free end of a workpiece with said inclined planar surface.

9. A workpiece support as defined in claim 1 in which
   (a) said pivotally supporting means includes spaced bracket members extending downwardly from said workpiece engaging member,
   (b) said bracket members each carrying means for journally receiving pivot shaft means.

10. A workpiece support as defined in claim 9 in which said journally receiving means are located to the rear of the center of gravity of said workpiece engaging member, thereby enabling said workpiece engaging member to pivot in response to the pull of gravity into said planar surface inclined position toward the processing station.

11. A workpiece support as defined in claim 1 in which said pivotally supporting means includes
   (a) spaced bracket members extending downwardly from said workpiece engaging member,
   (b) yoke means having spaced arms extending upwardly from a cross member,
   (c) each yoke arm being associated with and located proximate to one of said bracket members, and
   (d) means for pivotally connecting each yoke arm to its associated bracket member.

12. A workpiece support as defined in claim 11 which further includes
   (a) a cross piece member extending between said spaced bracket members forward of the center of gravity of said pivotally mounted workpiece engaging member,
   (b) said cross piece having sufficient weight to pivot said substantially planar surface of said workpiece engaging member into said inclined position.

13. A workpiece support as defined in claim 12 in which said cross piece member is located so that a lower edge thereof rests against at least one arm of said yoke means when said planar surface of said workpiece engaging member is in said inclined position, thereby serving as a stop means to insure that said planar surface is inclined at the same angle each time to receive a free end of an advancing workpiece.

14. A workpiece support as defined in claim 11 which further includes means for releasably securing said workpiece engaging member in a work platform position with said planar surface in a substantially horizontal, comprising
   (a) at least one of said spaced bracket members having a platform position bore formed therethrough, and in which a yoke arm associated with said one bracket member also has a bore formed therethrough, (b) said bracket bore and said yoke arm bore being located so that when said workpiece engaging member is pivoted on said pivotally supporting means said bracket and yoke arm bores will be aligned when said planar surface is substantially horizontal, and (c) means for insertion through said aligned bores to releasably secure said workpiece engaging member in a work platform position.

15. A workpiece support as defined in claim 11 which further includes means for releasably securing said workpiece engaging member in a compact storage position with said planar surface in a substantially vertical position, comprising (a) at least one of said spaced bracket members having a storage bore formed therethrough, and in which a yoke arm associated with said one bracket member also has a bore formed therethrough, (b) said bracket bore and said yoke arm bore being located so that when said workpiece engaging member is pivoted on said pivotally supporting means said bracket and yoke arm bores will be aligned when said planar surface is substantially vertical, and (c) means for insertion through said aligned bores to releasably secure said workpiece engaging member in a compact storage position.

16. A workpiece support as defined in claim 11 which further includes means attached to and extending downwardly from said yoke means for releasably connecting said workpiece support attachment to a base support.

17. A workpiece support as defined in claim 16 which further includes means for selectively adjusting the height of said workpiece support.

* * * * *